(12) United States Patent
James (10) Patent No.: US 7,944,909 B2
(45) Date of Patent: *May 17, 2011

(54) SYSTEM, METHOD AND APPARATUS FOR SUPPORTING E911 EMERGENCY SERVICES IN A DATA COMMUNICATIONS NETWORK

(75) Inventor: Anthony W. James, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 1333 days.

This patent is subject to a terminal disclaimer.

(21) Appl. No.: 11/363,576

(22) Filed: Feb. 27, 2006

(65) Prior Publication Data

US 2007/0253429 A1    Nov. 1, 2007

Related U.S. Application Data (63) Continuation of application No. 10/665,628, filed on Sep. 22, 2003, now Pat. No. 7,027,564.

(51) Int. Cl.
*H04L 12/66* (2006.01)
(52) U.S. Cl. ...... 370/352; 370/351; 370/356; 379/88.17
(58) Field of Classification Search .......... 370/352–356, 370/395.52; 379/88.17
See application file for complete search history.

(56) References Cited

U.S. PATENT DOCUMENTS

| | | | | |
|---|---|---|---|---|
| 6,363,138 | B1 | 3/2002 | Aprile | 379/45 |
| 6,526,125 | B1 | 2/2003 | Lindsay et al. | 379/45 |
| 6,618,476 | B1 | 9/2003 | Szeto et al. | 379/198 |
| 6,665,611 | B1 | 12/2003 | Oran et al. | 701/213 |
| 6,678,357 | B2* | 1/2004 | Stumer et al. | 379/45 |
| 6,771,742 | B2 | 8/2004 | McCalmont et al. | 379/45 |
| 6,782,422 | B1* | 8/2004 | Bahl et al. | 709/224 |
| 6,940,950 | B2* | 9/2005 | Dickinson et al. | 379/45 |
| 7,042,985 | B1* | 5/2006 | Wright | 379/45 |
| 7,330,464 | B2* | 2/2008 | Brouwer et al. | 370/352 |
| 7,453,990 | B2* | 11/2008 | Welenson et al. | 379/45 |
| 7,627,091 | B2* | 12/2009 | Becker et al. | 379/37 |
| 2003/0063714 | A1* | 4/2003 | Stumer et al. | 379/37 |
| 2004/0057425 | A1* | 3/2004 | Brouwer et al. | 370/352 |
| 2004/0073597 | A1 | 4/2004 | Caveney et al. | 709/200 |
| 2004/0125923 | A1* | 7/2004 | See et al. | 379/88.17 |
| 2006/0281437 | A1* | 12/2006 | Cook | 455/404.2 |

OTHER PUBLICATIONS

Office Action issued in U.S. Appl. No. 10/665,628, dated Apr. 13, 2005.
Office Action issued in U.S. Appl. No. 10/665,628, dated Aug. 23, 2005.

(Continued)

*Primary Examiner* — Nathan Flynn
*Assistant Examiner* — Khaled Kassim
(74) *Attorney, Agent, or Firm* — Nixon Peabody LLP; John P. Schaub (57) ABSTRACT

A system, method and apparatus for supporting enhanced 911 (E911) emergency services, in a data communications network that includes Voice over Internet Protocol (VoIP) telephones. A network system includes a host network communicatively coupled to an E911 database management system, a network access device, and a VoIP telephone communicatively coupled to an input port of the network access device. The network access device is adapted to assign a physical location identifier to an input port, to authenticate the VoIP telephone, wherein the authentication includes receiving a unique device identifier from the VoIP telephone, and to transmit the location identifier and the unique device identifier to the E911 database management system. The E911 database management system is permitted to store the physical location identifier in association with the unique device identifier.

16 Claims, 6 Drawing Sheets

OTHER PUBLICATIONS

Notice of Allowance issued in U.S. Appl. No. 10/665,628, dated Jan. 6, 2006.

Cisco Systems, Inc., Chapter 1, "Using Cisco Emergency Responder", Cisco Emergency Responder User's Guide, 2002, pp. 1-12.

Cisco Systems, Inc., "Cisco Emergency Responder 1.2.1", 1992-2003, pp. 1-8.

Case et al., "Introduction and Applicability Statements for Internet Standard Management Framework", Dec. 2002, pp. 1-27.

* cited by examiner

SYSTEM, METHOD AND APPARATUS FOR SUPPORTING E911 EMERGENCY SERVICES IN A DATA COMMUNICATIONS NETWORK

CROSS-REFERENCE TO RELATED APPLICATION

This application is a continuation of application Ser. No. 10/665,628, entitled "SYSTEM, METHOD AND APPARATUS FOR SUPPORTING E911 EMERGENCY SERVICES IN A DATA COMMUNICATIONS NETWORK" by Anthony W. James, filed on Sep. 22, 2003 now U.S. Pat. No. 7,027,564.

BACKGROUND OF THE INVENTION

1. Field of the Invention

The present invention is generally directed to Voice over Internet Protocol (VoIP) telephony. In particular, the present invention is directed to supporting enhanced 911 (E911) emergency services in a data communications network that includes VoIP telephones.

2. Background

Internet Protocol (IP) telephony is an important part of the convergence of data, voice and broadband services into a single integrated information environment. Voice over Internet Protocol (VoIP) refers to an organized effort to standardize IP telephony and is a term used in IP telephony for a set of facilities for managing the delivery of voice information using the Internet Protocol. In IP telephony, voice information is transmitted in discrete packets over shared bandwidth, rather than over the traditional circuit driven protocol used by the traditional Public Switched Telephone Network (PSTN). The goal of VoIP is to use the Internet environment, which was not designed to provide traditional "toll" Quality of Service (QoS) for telephony, to provide the same high quality voice transmission that the traditional PSTN currently enjoys. IP telephony service providers include, or soon will include, local telephone companies, long distance providers, cable TV companies, Internet service providers (ISPs), wireless service providers and fixed wireless local loop service operators.

As VoIP efforts progress, the first VoIP telephones are becoming commercially available. VoIP telephones offer flexibility not available in traditional plain old telephones (POTS). For instance, like a laptop computer, a VoIP telephone can be easily moved from one point of network access to another without the assistance of a telephony administrator, and without having to change its identifying characteristics. Such identifying characteristics may include a telephone number, an IP address, and/or a media access control (MAC) address. While such ease of access may be desirable from an end user perspective, it creates significant concerns from the perspective of providing mission critical services such as enhanced emergency services, also known as E911.

The 3-digit telephone number 9-1-1 has been designated for public use throughout the United States and Canada to report an emergency, request emergency assistance, or both. By dialing 9-1-1, a person is provided direct access to a Public Safety Answering Point (PSAP). A PSAP is an agency or group of agencies designated and authorized to receive and respond to emergency calls requiring one or more public services, such as Police, Fire or Emergency Medical Service. Because the 9-1-1 number does not change, and there are thousands of PSAP's in the United States and Canada, it is vital that 9-1-1 calls are routed to the appropriate PSAP—i.e., the one closest to the location where the call originates. Traditionally, before the advent of mobile telephones, a telephony administrator, normally working for the local telephony service provider, automatically routed calls from a fixed telephone to the nearest PSAP. Because a telephony administrator was required to move a user's extension from one location to another, the administrator could also ensure proper routing of 9-1-1 calls.

With the advent of mobile telephones, a new system was necessary. This led to the advent of enhanced emergency services, or enhanced 911 (E911). The main characteristic of E911 service is the capability to selectively route a 9-1-1 call originating from any device (mobile and fixed alike) in the E911 service area to the correct PSAP designated to serve the originating devices' location. Another key feature of E911 is that it also provides the PSAP operator with the location of the calling device and a callback number. These enhanced features are implemented primarily through the use of Selective Routing (SR), and maintenance of an Automatic Location Identification (ALI) database. Selective Routing refers to the routing of a 9-1-1 call to the proper PSAP based upon the location of the caller. The ALI database, which is regularly updated to match telephone numbers to physical locations, works within a database management system to automatically provide the PSAP operator the physical location of the calling device and a callback number.

The ability to support E911 services is mandated in many states. In a VoIP environment, it is possible for a user to successfully move their IP phone from one network access point to another without notifying the telephony administrator. In this case, the telephony administrator would be unable to update the ALI database with the new location of the user and as a result, the ALI database would not contain the new location of that user. The ability to provide physical location information to update E911 service database is available for VoIP deployment, but conventional solutions are proprietary, and require the user to choose the same vendor to provide, upgrade, and replace key system components. The concern with this approach is that it does not allow users to take advantage of industry innovations. Instead, customers are forced to rely on products from a single vendor.

It would be beneficial, then, to provide integration between a network infrastructure for E911 services and VoIP telephones that is based on industry standards, rather than proprietary technologies. It would also be beneficial to provide a system, method and apparatus for supporting E911 emergency services in a data communications network by automatically updating an ALI database each time a user changes the location of a VoIP telephone within the network.

BRIEF SUMMARY OF THE INVENTION

The present invention is directed to a network system, method and apparatus that substantially obviates, one or more of the problems and disadvantages of the related art. In particular, the present invention is directed to a system, method and apparatus for supporting enhanced 911 (E911) emergency services in a data communications network by facilitating the identification of a physical location of a VoIP telephone.

A method of supporting E911 emergency services in a network access device in accordance with an embodiment of the present invention includes assigning a physical location identifier to an input port of the network access device, detecting a Voice over Internet Protocol (VoIP) telephone coupled to the input port, authenticating the VoIP telephone, wherein authenticating includes receiving a unique device identifier from the VoIP telephone, and transmitting the unique device identifier and the physical location identifier to an E911 database management system. This method permits the E911 database management system to store the physical location identifier in association with the unique device identifier. Preferably, the authentication of the VoIP telephone is performed in accordance with an industry-recognized protocol, such as IEEE 802.1x.

An embodiment of the present invention also includes a network access device that supports E911 emergency services. The device includes an input port, a switching fabric for routing data received via the input port to at least one output port, and control logic. The control logic is adapted to assign a physical location identifier to the input port, to authenticate a VoIP telephone when the VoIP telephone is coupled to the input port, wherein the authentication includes receiving a unique device identifier from the VoIP telephone, and to transmit the unique device identifier with the physical location identifier to an E911 database management system. This permits the E911 database management system to store the physical location identifier in association with the unique device identifier. Preferably, the authentication of the VoIP telephone is performed in accordance with an industry-recognized protocol, such as IEEE 802.1x.

An embodiment of the present invention further includes a network system for supporting E911 emergency services. The network system includes a host network, a network access device, and a VoIP telephone. The host network is communicatively coupled to an E911 database management system. The network access device is communicatively coupled to the host network. The VoIP telephone is communicatively coupled to an input port of the network access device. The network access device is adapted to assign a physical location identifier to the input port, to authenticate the VoIP telephone, wherein the authentication includes receiving a unique device identifier from the VoIP telephone, and to transmit the location identifier and the unique device identifier to the E911 database management system. This permits the E911 database management system to store the physical location identifier in association with the unique device identifier. Preferably, the authentication of the VoIP telephone is performed in accordance with an industry-recognized protocol, such as IEEE 802.1x.

Yet another embodiment of the invention includes a method of supporting enhanced 911 (E911) emergency services that leverages an industry standard management information protocol. The method includes assigning a physical location identifier to an input port of a network access device. The network access device transmits an automatic report to an E911 database management system (DBMS) when a user device is coupled to the input port. Next, the network access device transmits a unique device identifier of the user device to the E911 DBMS in response to an identification query from the E911 DBMS. If the user device is a VoIP telephone, then the network access device transmits the physical location identifier to the E911 DBMS in response to a physical location query from the E911 DBMS. The above method allows the E911 DBMS to automatically update an automatic location identification database with the physical location of the VoIP telephone.

Embodiments of the present invention are an improvement over conventional solutions because they provide a standards-based manner for complying with E911 requirements that avoids reliance on proprietary technology.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview

The present invention provides a system, method and apparatus for supporting enhanced 911 (E911) emergency services in a data communications network that includes Voice over Internet Protocol (VoIP) telephones, by facilitating the identification of a physical location of a VoIP telephone. An embodiment of the invention allows a host network to comply with E911 requirements using a standards-based approach that is, independent of proprietary technologies used by the host network. Specifically, information obtained from a VoIP telephone by a network access device during execution of a standard user authentication protocol is coupled with port location information to automatically update an Automatic Location Information (ALI) database of the E911 vendor. Such an automatic update provides comprehensive location details for each VoIP telephone connected to the host network. In a preferred embodiment, information obtained during execution of a user authentication protocol in accordance with the IEEE 802.1x standard is used to comply with E911 requirements.

An alternate embodiment allows a host network to comply with E911 requirements using an industry standard protocol that facilitates the automatic exchange of management information between network devices. Preferably, the Simple Network Management Protocol (SNMP) is used to automatically provide comprehensive location details for each VoIP telephone connected to the host network directly to the E911 database management system 137 of the E911 vendor.

B. Exemplary Operating Environment

Figure 1:
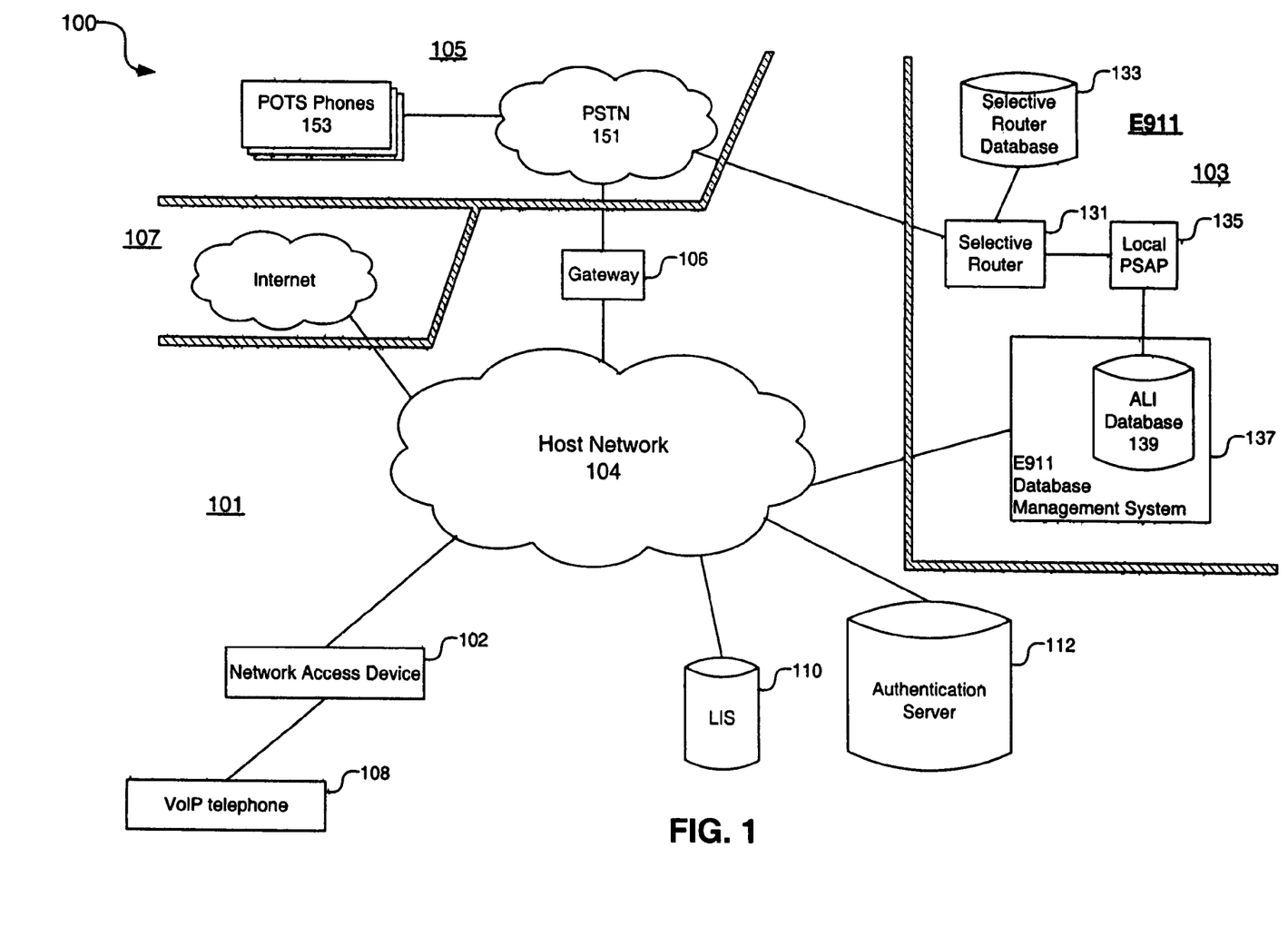
FIG. 1 depicts the basic elements of a data communications system in accordance with an embodiment of the present invention.

FIG. 1 depicts the basic elements of an integrated modern voice and data communications system 100 in which an embodiment of the present invention may operate. As shown in FIG. 1, system 100 comprises a local data communications network 101, which is communicatively coupled to an E911 network 103, a public telephone network 105, and the Internet 107. These networks and devices included therein are described in more detail herein.

1. Local Data Communications Network

Local data communications network 101 comprises a plurality of network nodes interconnected via a wired and/or wireless medium. Each node consists of a device capable of transmitting or receiving data over a host network 104. Local data communications network 101 may exist, for example, in a business enterprise such as a law firm, an engineering company, or an Internet based store. As shown in FIG. 1, local data communications network 101 comprises host network 104, a network access device 102 communicatively coupled to host network 104, and a VoIP telephone 108 communicatively coupled to network access device 102. Local data communications network 101 also includes a local identification server (LIS) 110, an authentication server 112, and a gateway 106 to public telephone network 105.

In the embodiment described herein, host network 104 comprises a conventional local area network ("LAN") that employs an Ethernet communication protocol in accordance with the IEEE 802.3 standard for data link and physical layer functions. However, the invention is not so limited, and host network 104 may comprise other types of networks, including but not limited to a wide area network ("WAN"), and other types of communication protocols, including but not limited to ATM, token ring, ARCNET, or FDDI (Fiber Distributed Data Interface) protocols.

Network access device 102, which preferably comprises a network switch, is a device that comprises a plurality of ports for communicatively interconnecting network devices to each other and to host network 104. Network access device 102 is configured to channel data units, such as data packets or frames, between any two devices that are attached to it up to its maximum number of ports. In terms of the International Standards Organization's Open Systems Interconnection (OSI) model, network access device 102 performs layer 2, or data link layer, functions. In particular, network access device 102 examines each received data unit and, based on a destination address included therein, determines which network device the data unit is intended for and switches it out toward that device. Network access device 102 is described in more detail herein with respect to FIG. 2.

As depicted in FIG. 1, VoIP telephone 108 is communicatively coupled to one of the ports of network access device 102. As will be appreciated by persons skilled in the relevant art(s), VoIP telephone 108 enables a user to place and receive VoIP telephone calls via local data communications network 104. VoIP telephone 108 is described in more detail herein with respect to FIG. 3.

Authentication server 112 comprises a computer that stores application software and a database of profile information for performing a user authentication protocol, such as a user authentication protocol in accordance with the IEEE 802.1x standard. In an embodiment, authentication server 112 comprises a server that uses the Remote Authentication Dial-In User Service (RADIUS) as set forth in Internet Engineering Task Force (IETF) Request For Comments (RFC) 2865 for performing user authentication functions.

Local identification server (LIS) 110 is a device administered by the host network administrator. LIS 110 is configured with data that provides an association between physical port connections and location information. LIS 110 permits a network administrator to collect and store a complete host network 104 infrastructure inventory, including all network access devices 102 and their complete configuration, as well as device addresses (MAC and IP). This information can then be used to feed an E911 database management system 137 with device location information. Once the inventory has been collected, the E911 database management system 137 can use industry-standard Structured Query Language (SQL) to determine the location of all VoIP telephones. Alternatively, Simple Network Management Protocol (SNMP) can be used to determine the location of all VoIP telephones.

2. Enhanced 911 (E911) Network

Enhanced 911 (E911) network 103 is an example of a conventional E911 network, the structure and function of which are well-known in the art. As shown in FIG. 1, E911 network 103 comprises a selective router 131 and a local Public Service Answering Point (PSAP) 135. Selective router 131 (also referred to as an enhanced 911 control office) is communicatively coupled to a selective router database 133. Selective router 131 uses selective router database 133 to provide for the tandem switching of 9-1-1 calls and to ensure the routing of a 9-1-1 call to the proper PSAP along with an automatic number identification (ANI). The ANI is the telephone number associated with the access line from which a call originates. Selective router 131 also provides certain maintenance functions for each PSAP.

Local PSAP 135 is communicatively coupled to an Automatic Location Identification (ALI) database 139. ALI database 139 is a database that uniquely correlates an ANI with a physical location for each telephone connected to the local network. Once a 9-1-1 call is routed to local PSAP 135, local PSAP 135 communicates with ALI database 139 to automatically display the physical location and telephone number of the telephone being used to make the 9-1-1 call. Such information allows the PSAP operator to direct the requested services to the proper location, and allows the PSAP operator to call back in the event the connection is lost, or more information is needed. ALI database 139 also provides, supplementary emergency services information.

An E911 database management system 137 keeps the data stored in ALI database 139 up-to-date. Typically, the E911 database management system 137 uses the Transmission Control Protocol/Internet Protocol (TCP/IP) protocol suite to facilitate the exchange of information between network devices such as the local PSAP 135 and the ALI database 139. The TCP/IP protocol suite includes an application layer called the Simple Network Management Protocol (SNMP), which facilitates the automatic exchange of management information.

The task of ensuring that the data stored in the ALI database 139 is up-to-date is generally the responsibility of telephony administrators. This is typically accomplished via periodic updates from telephony administrators. Such an approach requires telephony administrators to have a complete awareness of the physical location of a given telephone at any point in time. Consequently, in a case where a user moves a VoIP telephone 108 from one point of network access to another without informing a telephony administrator, ALI database 139 may become out-of-date and, therefore, unreliable. As will be described in more detail herein, an embodiment of the present invention addresses this problem by facilitating automatic updates of ALI database 139 in instances where a user moves a VoIP telephone 108 to a new point of network access.

3. PSTN Network

Public telephone system 105 is an example of a conventional public telephone system, the structure and function of which are well-known in the art. As shown in FIG. 1, public telephone system 105 comprises a Public Switched Telephone Network 151, and a plurality of plain old telephones (POTS) 153. Gateway 106 provides the interface between the host network 104, which comprises a packet-switched network, and the PSTN 151, which comprises a circuit-switched network, so that voice communication may be achieved between POTS phones 153 and VoIP telephones within data communications network 101, such as VoIP telephone 108.

Figure 2:
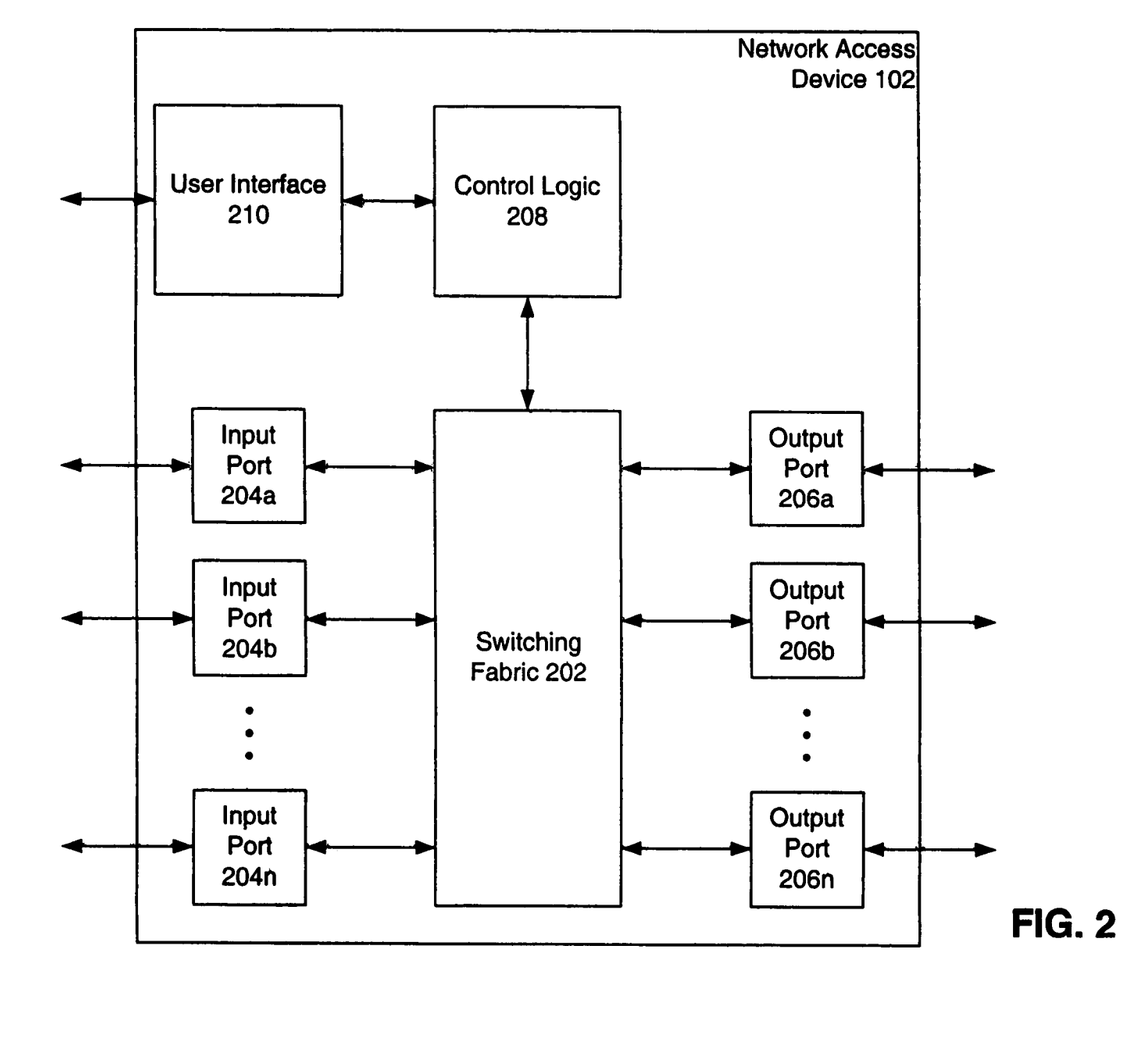
FIG. 2 depicts an exemplary high-level architecture of a network access device in accordance with an embodiment of the present invention

C. Network Access Device in Accordance with an Embodiment of the Present Invention FIG. 2 depicts an exemplary high-level architecture of network access device 102 in accordance with an embodiment of the present invention. As shown in FIG. 2, network access device 102 comprises a plurality of input ports, 204a-204n, that are coupled to a plurality of output ports, 206a through 206n, via a switching fabric 202. Network access device 102 also includes control logic 208 for controlling various aspects of switch operation and a user interface 210 to facilitate communication with control logic 208. User interface 210 provides a means for a user, such as a system administrator, to reconfigure the network access device 102 and adjust operating parameters.

In operation, data units (e.g, packets or frames) are received and optionally buffered on one or more of input ports 204a through 204n. Control logic 208 schedules the serving of data units received by input ports 204a-204n in accordance with a predetermined scheduling algorithm. Data units are then served to switching fabric 202, which routes them to the appropriate output port 206a-206n based on, for example, the destination address of the data unit. Output ports 206a-206n receive and optionally buffer data units from switching fabric 202, and then transmit them on to a destination device. In accordance with an embodiment of the present invention, network access device 102 may also include logic 208 for performing routing functions (layer 3 or network layer functions in OSI).

Control logic 208 can be configured to assign (i.e., store in memory unit) a physical location identifier for each input port 204a-204n. The physical location identifier is the actual physical location of a termination point for a particular input port. This is accomplished through a command level interface (CLI) instruction, described in more detail herein. Control logic 208 can be also be configured to execute a user authentication protocol (e.g., IEEE 802.1x) whenever a device is coupled to one of the input ports 204a-204n. Control logic 208 can also be configured to support the TCP/IP protocol suite, which includes the SNMP application layer. Execution of a user authentication protocol and use of SNMP are described in more detail herein.

Figure 3:
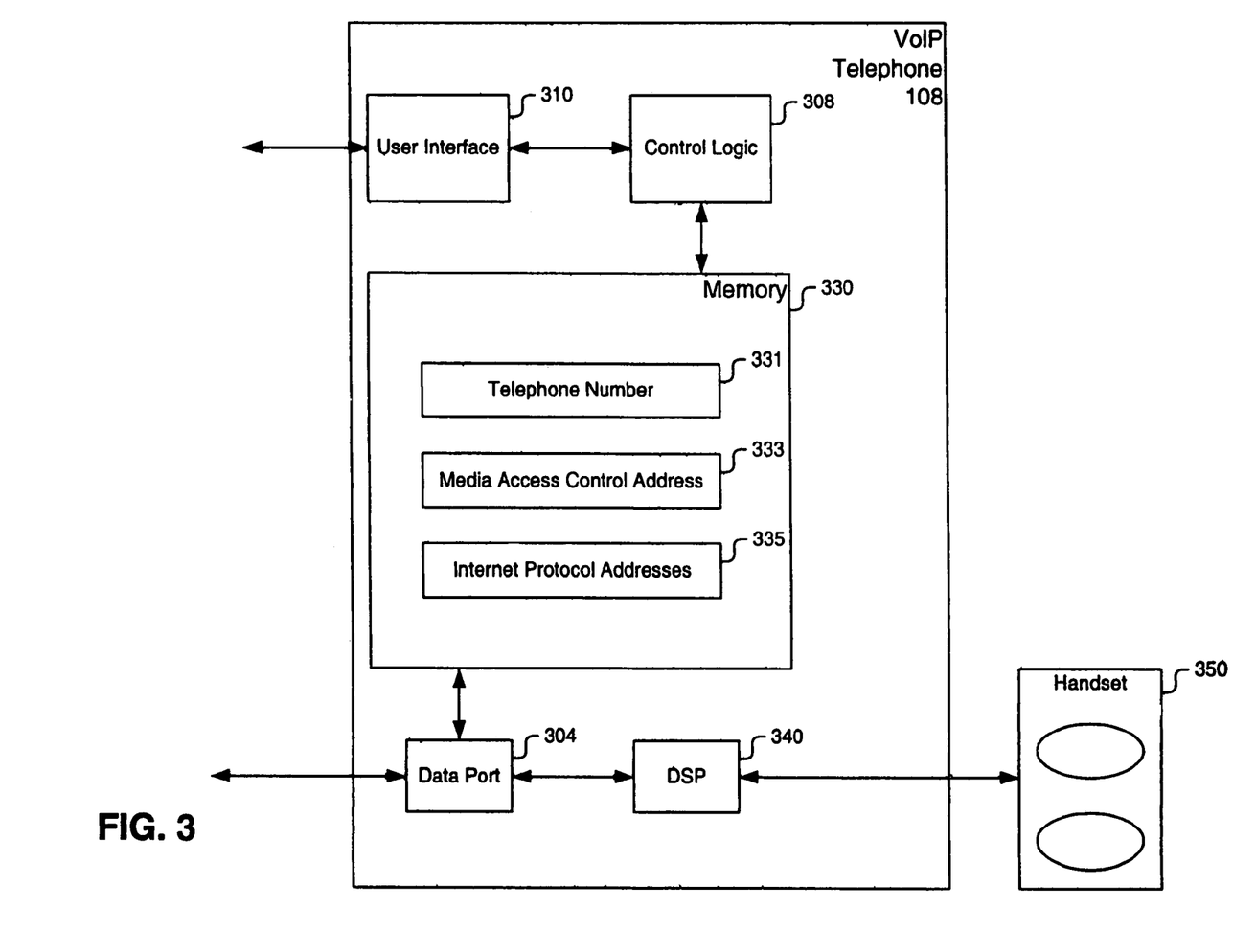
FIG. 3 depicts an exemplary high-level architecture of a Voice over Internet Protocol (VoIP) telephone in accordance with an embodiment of the present invention.

D. Voice over Internet Protocol (VoIP) Telephone in Accordance with an Embodiment of the Present Invention FIG. 3 depicts a VoIP telephone 108 in accordance with an embodiment of the present invention. VoIP telephone 108 is adapted to transmit and receive data, including voice data, over a data communications network, such as host network 104. As shown in FIG. 3, VoIP telephone 108 includes a user interface 310 coupled to control logic 308, which is in turn coupled to a memory unit 330. Memory unit 330 interfaces with both control logic 308 and a data port 304, and is used to store identification information which includes a telephone number 331, a media access control (MAC) address 333 and an Internet Protocol (IP) address 335, each of which uniquely identifies VoIP telephone 108. VoIP telephone 108 further includes a digital signal processor (DSP) 340 and handset 350 that allow an analog voice signal to be relayed to and from data port 304 in digitized format in accordance with IP.

In accordance with an embodiment of the present invention, data port 304 of VoIP telephone 108 may be communicatively coupled to one of the input ports 204a-n of network access device 102, as illustrated in FIG. 1. For example, VoIP telephone 108 may be coupled to an RJ-45 connector, which is in turn-wired to an input port of network access device 102. VoIP telephone 108 is highly portable, and thus may be readily moved from one point of network access to another.

As described in more detail herein, control logic 308 of VoIP telephone 108 is advantageously configured to support a user authentication protocol such as, but not limited to, a user authentication protocol in accordance with the IEEE 802.1x standard. Thus, in an embodiment, when coupled to an input port 204a-204n of network access device 102, VoIP telephone 108 performs the role of an 802.1x supplicant seeking access to host network 104. In another embodiment, control logic 308 of VoIP telephone 108 is advantageously configured to support the TCP/IP protocol suite, of which the SNMP application layer is a part. These embodiments are explained more fully below. By supporting an industry standard user authentication protocol, or an industry standard management information protocol, VoIP telephone 108 provides increased flexibility in that it can be coupled to a wider variety of host networks. Use of industry standard protocols also confers other advantages in accordance with embodiments of the present invention, including the ability to more easily comply with E911 requirements.

E. Industry Standard Protocols

1. Authentication Protocol

An embodiment of the present invention uses industry standard protocols to automatically identify and retrieve identification information from a VoIP telephone 108 that is coupled to host network 104. In an embodiment, the IEEE 802.1x standard is used for this purpose. As will be appreciated by persons skilled in the relevant art(s), the 802.1x standard is a standard for port-based network access control for local and metropolitan area networks. Port-based network access control makes use of the physical access characteristics of IEEE 802® Local Area Networks (LAN) infrastructures in order to provide a means of authenticating and authorizing devices attached to a LAN port that has point-to-point connection characteristics. The 802.1x standard is hereby incorporated by reference in its entirety.

The 802.1x standard encompasses a user authentication protocol. A Port Access Entity (PAE) exists for each port of a system that uses the 802.1x authentication protocol. The operation of the authentication process makes use of the Extensible Authentication Protocol (EAP), as specified in the Internet Engineering Task Force (IETF) Request For Comments (RFC) 2284. EAP provides a means for communicating authentication information between a PAE Supplicant (device being authenticated) and a PAE Authenticator (device doing the authenticating). Put differently, an Authenticator PAE is responsible for enforcing the authentication of a Supplicant PAE that is coupled to its controlled port, and for controlling the authorization state of the controlled port accordingly. Whether a device will be authenticated depends on the information stored in an Authentication Server, such as authentication server 112 depicted in FIG. 1.

EAP is a general protocol that supports multiple authentication mechanisms. For example, rather than only permitting a predetermined authentication method, EAP allows the Authenticator to request various types of information before determining the specific authentication mechanism. Examples of such information, called "request types," include Identity, MD5-challenge, One-Time Passwords, and Generic Token Cart. Moreover, as part of the authentication protocol, statistical information regarding the current session associated with a port may be solicited. In order to solicit such information, each such session has a User-Name (dot1xAuthSessionUserName) that represents the identity of the Supplicant PAE.

In an embodiment of the present invention, VoIP telephone 108 is adapted to act as the Supplicant PAE, while network access device 102 is adapted to act as the Authenticator PAE. In a preferred embodiment, VoIP telephone 108, is configured to provide the unique telephone number assigned to it as its User-Name during participation in the 802.1x user authentication protocol. As will be discussed in more detail below, this allows network access device 102 to easily link the telephone number assigned to VoIP telephone 108 with a physical location identifier associated with VoIP telephone 108, such that this information can be automatically transmitted to E911 database management system 137 or, optionally, to LIS 110 prior to transmission to E911 database management system 137.

2. Network Management Information Protocol

Another embodiment of the present invention uses industry standard information management protocols to automatically send and retrieve identification information from a VoIP telephone 108 that is coupled to a host network. In an embodiment, the industry standard Simple Network Management Protocol (SNMP) is used for this purpose.

As will be appreciated by those skilled in the art, the SNMP is an application layer protocol that facilitates the exchange of management information between network devices. It is part of the Transmission Control Protocol/Internet Protocol (TCP/IP) protocol suite. SNMP enables network administrators to manage network performance, find and solve network problems, and plan for network growth.

An SNMP-managed network consists of three key components: managed devices, agents, and network-management systems (NMSs). A managed device is a network node that contains an SNMP agent and that resides in a managed network. Managed devices collect and store management information and make this information available to NMSs using SNMP. Managed devices can be routers, switches, hubs, a network access device 102, or a VoIP telephone 108. An agent is a network-management software module that resides in a managed device. An agent has local knowledge of management information and translates that information into a form compatible with SNMP. An NMS executes applications that monitor and control managed devices. One or more NMSs must exist on any managed network.

There are four basic SNMP commands: read, write, trap and traversal operations. The read command is used by an NMS to monitor managed devices. The write command is used by an NMS to control managed devices by changing the value of variables stored therein. The trap command is used by managed devices to asynchronously report events to the NMS. When certain types of events occur, a managed device, such as a network access device 102 or a VoIP telephone 108, sends a trap to the NMS. Traversal operations are used by the NMS to determine which variables a managed device supports and to sequentially gather information in variable tables, such as a routing table.

Where a VoIP telephone 108, and a network access device 102 reside on an SNMP-managed network, SNMP can be leveraged to enable compliance with E911 requirements where the E911 database management system 137 is also an SNMP-managed network. More specifically, SNMP may be used to automatically update the E911 ALI database 139 when a VoIP user changes location within a network. This embodiment is discussed in more detail below.

Figure 4:
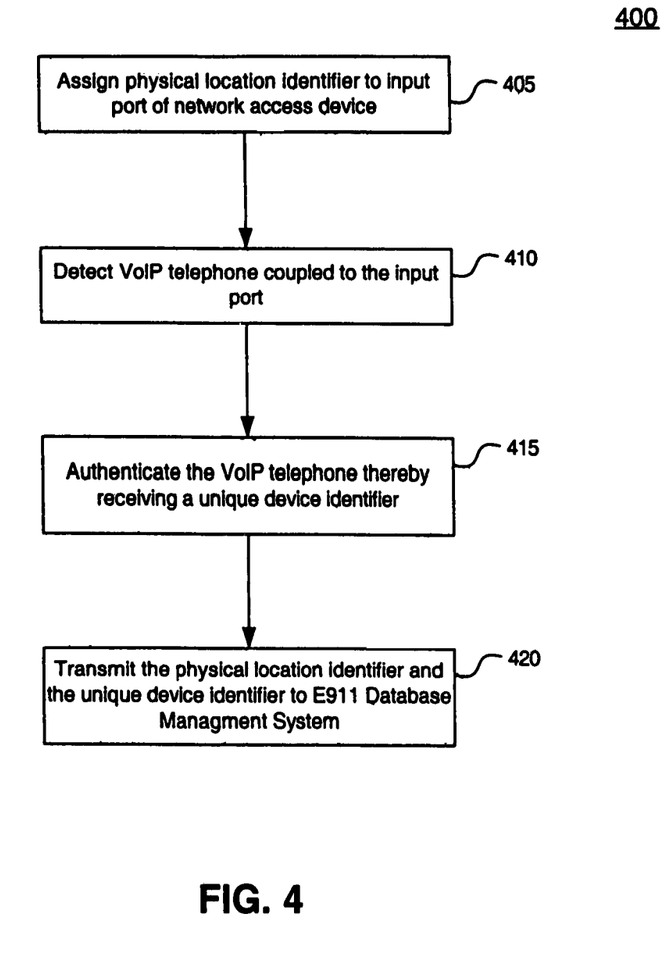
FIG. 4 is a flowchart describing a method for supporting enhanced 911 (E911) emergency services in a data communications network that includes VoIP telephones in accordance with an embodiment of the present invention.

F. Method for Supporting Enhanced 911 (E911) Emergency Services in a Network Access Device in Accordance with an Embodiment of the Present Invention 1. Method Using an Industry Standard Authentication Protocol FIG. 4 illustrates a flowchart 400 of a method for supporting enhanced 911 (E911) emergency services in a data communications system 100 that includes VoIP telephones 108 in accordance with an embodiment of the present invention. The invention, however, is not limited to the description provided by the flowchart 400. Rather, it will be apparent to persons skilled in the relevant art(s) from the teachings provided herein that other functional flows are within the scope and spirit of the present invention. Flowchart 400 will be described with continued reference to example system 100, example network access device 102, and example VoIP telephone 108 described above in reference to FIGS. 1-3. The invention, however, is not limited to those embodiments.

The method of flowchart 400 begins at step 405, in which a physical location identifier is assigned to one or more input ports 204a-204n of network access device 102. In an embodiment, a network administrator utilizes user interface 210 to associate one or more of input ports 204a-204n with a physical location identifier. The physical location identifier may comprise location information that identifies a location of a termination point of the port. In an embodiment, the physical location identifier is preferably embodied in a port-name of the port. For example, a command level interface (CLI) configuration for assigning a physical location to a port-name is: FES4802 Switch(config-if-e100-1)#port-name "Building 1, Floor 2, West, Cube 2202." In this fashion, the location of the termination point of each input port 204a-204n of network access device 102 may be included in its port-name identifier.

Next, according to step 410, network access device 102 detects a VoIP telephone 108 as it is coupled to an input port 204a-204n. Coupling VoIP telephone 108 to an input port 204a-204n may comprise, for example, coupling VoIP telephone 108 to an RJ-45 connector, which is in turn wired to an input port 204a-204n of network access device 102. At this point, a link is established according to a standard user access or authentication protocol supported by both VoIP telephone 108 and host network 104. In an embodiment, the common user authentication protocol is IEEE 802.1x.

Next, according to step 415, VoIP telephone 108 is authenticated in accordance with the user authentication protocol. As part of the user authentication protocol, VoIP telephone 108 provides a unique device identifier to network access device 102. This unique device identifier may comprise a physical (MAC) address 333 of VoIP telephone 108, an Internet Protocol (IP) address 335 of VoIP telephone 108, or a telephone number 331 of VoIP telephone 108. The invention, however, is not limited to these identifiers. In an embodiment in which the user authentication protocol is the 802.1x standard, then each authentication session is identified by a User-Name. In such an embodiment, it is preferable that the User-Name include the VoIP telephone number 331, so that the VoIP telephone number 331 is provided to network access device 102 as part of the standard 802.1x user authentication protocol. The User-Name thus becomes the unique device identifier.

Finally, according to step 420, network access device 102 transmits the unique device identifier provided by VoIP telephone 108 and the physical location identifier assigned to the input port 204a-204n to which it is coupled to the E911 database management system 137. In an embodiment, this information is included in the 802.1x User-Name of VoIP telephone 108 and in a port-name of the port 204a-204n to which VoIP telephone 108 is coupled. Transmission of User-Name and port-name thus permits the E911 database management system 137 to update and store these identifiers, thereby linking the VoIP telephone number 331 to its physical location. This method is repeated whenever a VoIP telephone 108 is coupled to a network port 204.

In accordance with this embodiment, the local PSAP 135 can now access the newly updated ALI database by interfacing with the E911 database management system 137. In the event a 9-1-1 call originates with the VoIP telephone 108, the PSAP operator will have an accurate location and a call-back telephone number for the VoIP telephone 108. The location information, as indicated by the physical location identifier, is embodied in the port-name. The telephone number, as indicated by the unique device identifier, is embodied in the User-Name of the 802.1x authentication session.

In an alternative embodiment, the User-Name and port-name may be transmitted to LIS 110. LIS 110 can then periodically communicate with the E911 database management system 137 to update the ALI database 139. This embodiment allows the host network administrator to track the location of a VoIP telephone 108 as it moves from access point to access point in host network 104.

2. Method Using an Industry Standard Information Management Protocol.

Figure 5A:
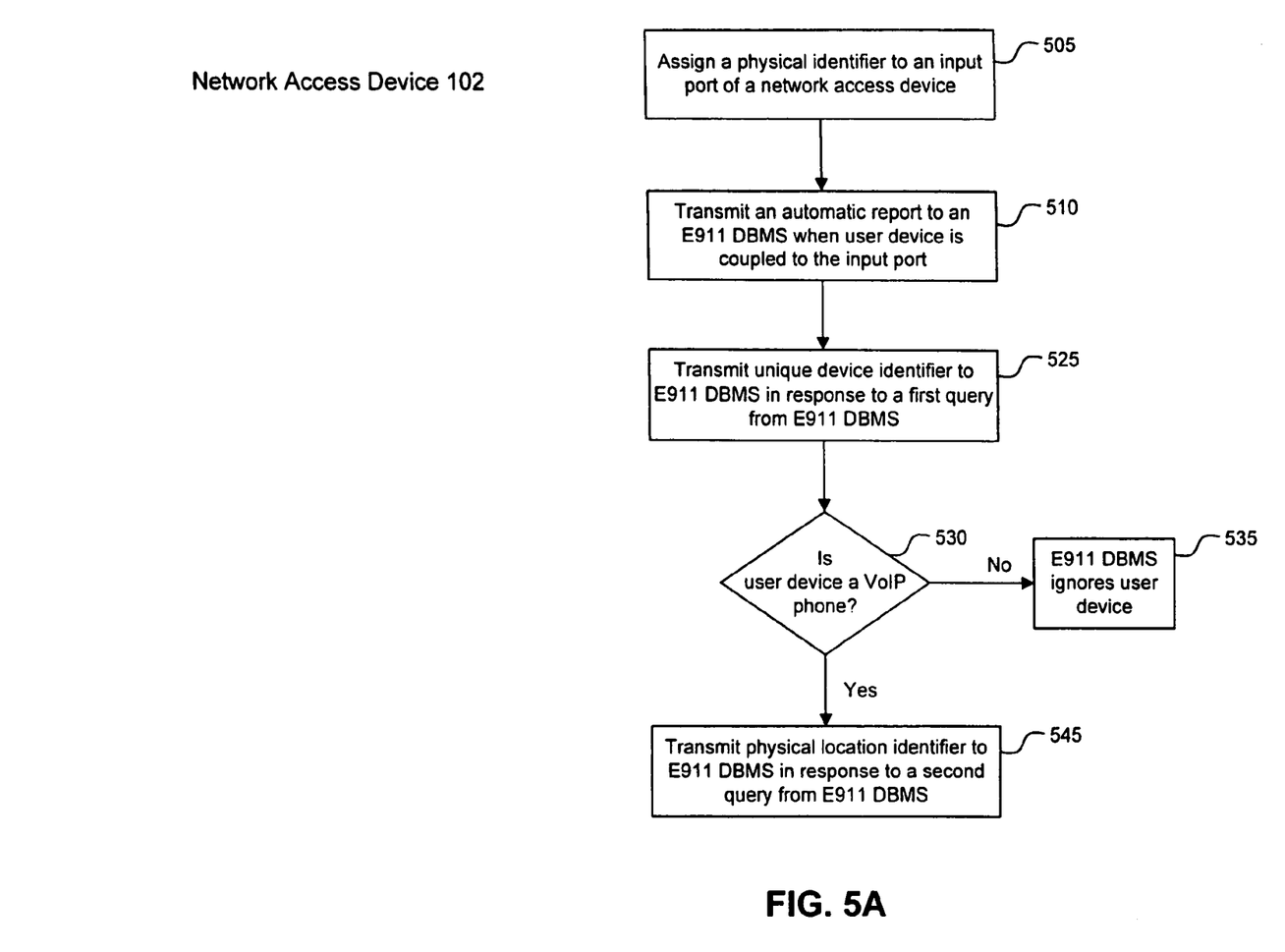
FIGS. 5A and 5B are flowcharts describing a method for supporting E911 emergency services in a data communications network that includes a VoIP telephone, a network access device, and an E911 database management system that support an industry standard management information protocol in accordance with an embodiment of the present invention.
Figure 5B:
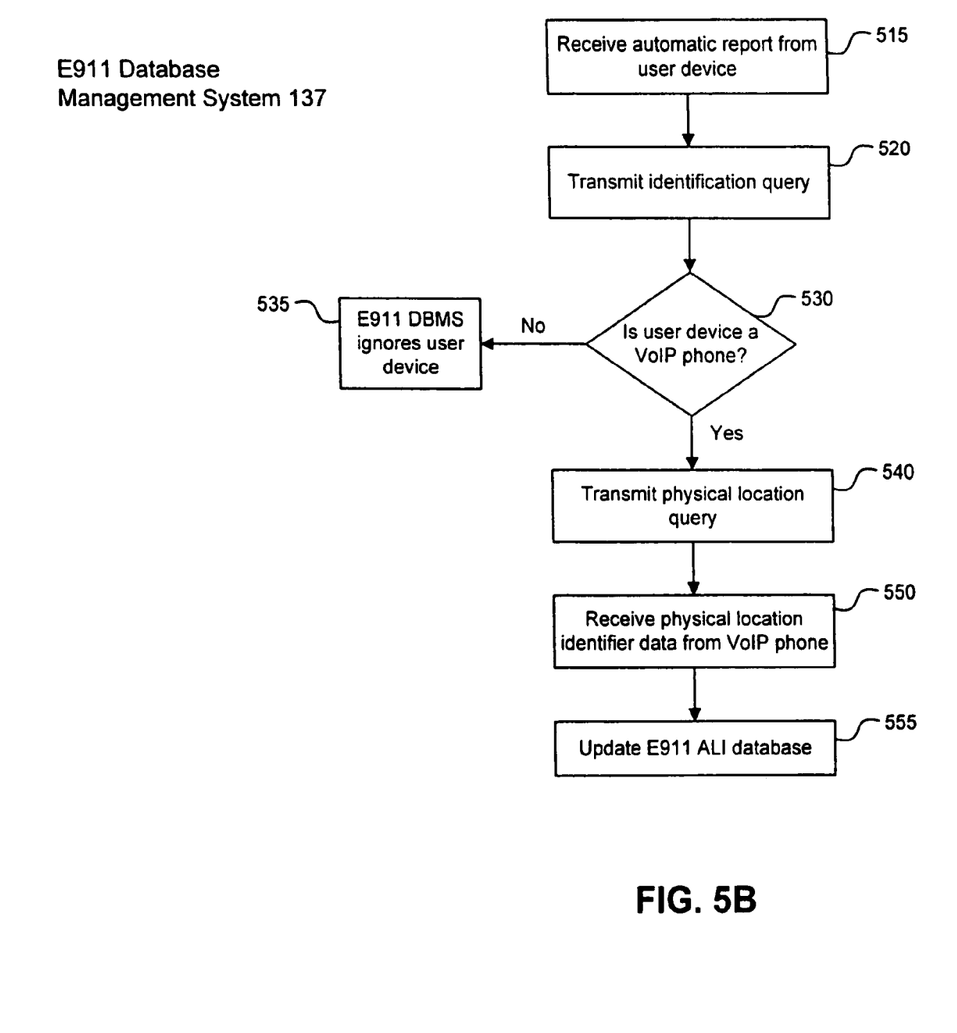

FIGS. 5A and 5B are flow charts illustrating a method of supporting enhanced 911 (E911) emergency services in a data communications system 100 that includes VoIP telephones 108. FIG. 5A illustrates the method from the perspective of the network access device 102, while FIG. 5B illustrates the method from the perspective of the E911 database management system (DBMS). The method is applicable where the network access device 102, the VoIP telephone 108, the host network 104, and the E911 DBMS 137 all support the same industry standard information management protocol, such as SNMP. Description of this embodiment of the invention is made with reference to both FIGS. 5A and 5B.

According to step 505 of FIG. 5A, an input port 204 of a network switch 102 is assigned a physical location identifier. The physical location identifier typically corresponds to the termination point of the input port 204.

According, to step 510, the network access device 102 transmits an automatic report to the E911 DBMS 137 when a user device, such as VoIP telephone 108, is coupled to the input port 204. In one embodiment, the automatic report is accomplished through an SNMP trap command. The SNMP trap destination is the E911 DBMS 137. As described above, an SNMP trap asynchronously reports events to the network management system (NMS). In this embodiment, the E911 DBMS is an NMS.

According, to step 515 of FIG. 5B, the automatic report is received at the E911 DBMS 137. The E911 DBMS 137 then automatically transmits an identification query to network access device 102, according to step 520. In one embodiment, the identification query takes the form of an SNMP read command.

The network access device 102, according to step 525 of FIG. 5A, is configured to respond to the identification query from the E911 DBMS by transmitting a unique device identifier of the user device to the E911 DBMS 137. In one embodiment, the transmission of the unique device identifier can be accomplished with an SNMP write command, while the unique device identifier itself can be a media access control (MAC) address 333 of the user device. From the MAC address 333, it is typically possible to identify both the class of device, and the particular device within that class. For instance, the MAC address 333 could identify the device as being a VoIP telephone generally, which belongs to a particular person to whom the phone has been assigned. Thus, the E911 DBMS is able to determine at least whether the device is a VoIP telephone 108, according to step 530 of FIGS. 5A and 5B.

Next, if the user device is not a VoIP telephone 108, then the E911 DBMS ignores the user device, according to step 535. If the user device is a VoIP telephone 108, then the E911 DBMS 137 transmits a physical location query to the network access device 102, according to step 540. The network access device 102 is configured to respond to the physical location query by transmitting the physical location identifier that was assigned to the input port 204 in step 505. In one embodiment, the physical location query can take the form of an SNMP read command, while the transmission of the physical location identifier can be accomplished with an SNMP write command.

Finally, in steps 550 and 555 of FIG. 5B, the E911 DBMS 137 receives the physical location identifier from the VoIP telephone 108. With the physical location identifier, the E911 DBMS 137 can automatically update the ALI database 139.

In an alternative embodiment, the above described method may be implemented to convey the unique device identifier and the physical location identifier to LIS 110. LIS 110 can then periodically communicate with the E911 DBMS 137 to update the ALI database 139. This embodiment allows the host network administrator to track the location of a VoIP telephone 108 as it moves from access point to access point in host network 104.

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
by a network access device having an input port, detecting a Voice over Internet Protocol (VoIP) telephone coupled to the input port, the network access device comprising a memory for storing a physical location identifier that identifies a physical location of a termination point of the input port;
when the network access device detects the VoIP telephone coupled to the input port, transmitting an automatic report towards an enhanced 911 (E911) database management system (DBMS);
transmitting a unique device identifier of the VoIP telephone towards the E911 DBMS in response to a first query from the E911 DBMS; and
transmitting the physical location identifier towards the E911 DBMS in response to a second query from the E911 DBMS.

2. The method of claim 1, wherein the authenticating includes authenticating the VoIP telephone in accordance with an IEEE 802.1x protocol.

3. The method of claim 1, wherein the authenticating includes receiving a unique device identifier that comprises a telephone number of the VoIP telephone.

4. The method of claim 1, wherein the authenticating includes receiving a unique device identifier that comprises an Internet Protocol (IP) address of the VoIP telephone.

5. The method of claim 1, wherein the authenticating includes receiving a unique device identifier that comprises a media access control (MAC) address of the VoIP telephone.

6. An apparatus comprising:
an input port;
a memory for storing a physical location identifier that identifies a physical location of a termination point of the input port;
a switching fabric configured to route data received via the input port towards to at least one output port of the apparatus; and
control logic adapted to:
detect a Voice over Internet Protocol (VoIP) telephone coupled to the input port;
when the apparatus detects the VoIP telephone coupled to the input port, transmit an automatic report towards an enhanced 911 (E911) database management system (DBMS);
transmit a unique device identifier of the VoIP telephone towards the E911 DBMS in response to a first query from the E911 DBMS; and
transmit the physical location identifier towards the E911 DBMS in response to a second query from the E911 DBMS.

7. The network access device of claim 6, wherein the control logic adapted to authenticate includes control logic adapted to authenticate the VoIP telephone in accordance with an IEEE 802.1x protocol.

8. The network access device of claim 6, wherein the control logic adapted to authenticate includes control logic adapted to receive a unique device identifier that comprises a telephone number of the VoIP telephone.

9. The network access device of claim 6, wherein the control logic adapted to authenticate includes control logic adapted to receive a unique device identifier that comprises an Internet Protocol (IP) address of the VoIP telephone.

10. The network access device of claim 6, wherein the control logic adapted to authenticate includes control logic adapted to receive a unique device identifier that comprises a media access control (MAC) address of the VoIP telephone.

11. An apparatus comprising:
an input port;
a memory for storing a physical location identifier that identifies a physical location of a termination point of the input port;
means for detecting a Voice over Internet Protocol (VoIP) telephone coupled to the input port;
means for, when the apparatus detects the VoIP telephone coupled to the input port, transmitting an automatic report towards to an enhanced 911 (E911) database management system (DBMS);
means for transmitting a unique device identifier of the VoIP telephone towards the E911 DBMS in response to a first query from the E911 DBMS; and
means for transmitting the physical location identifier towards the E911 DBMS in response to a second query from the E911 DBMS.

12. The apparatus of claim 11, wherein the means for authenticating includes means for authenticating the VoIP telephone in accordance with an IEEE 802.1x protocol.

13. The apparatus of claim 11, wherein the means for authenticating includes means for receiving a unique device identifier that comprises a telephone number of the VoIP telephone.

14. The apparatus of claim 11, wherein the means for authenticating includes means for receiving a unique device identifier that comprises an Internet Protocol (IP) address of the VoIP telephone.

15. The apparatus of claim 11, wherein the means for authenticating includes means for receiving a unique device identifier that comprises a media access control (MAC) address of the VoIP telephone.

16. A nontransitory program storage device readable by a machine, embodying a program of instructions executable by the machine to perform a method, the method comprising:
by a network access device having an input port, detecting a Voice over Internet Protocol (VoIP) telephone coupled to the input port, the network access device comprising a memory for storing a physical location identifier that identifies a physical location of a termination point of the input port;
when the network access device detects the VoIP telephone coupled to the input port, transmitting an automatic report towards an enhanced 911 (E911) database management system (DBMS); transmitting a unique device identifier of the VoIP telephone towards the E911 DBMS in response to a first query from the E911 DBMS; and
transmitting the physical location identifier towards the E911 DBMS in response to a second query from the E911 DBMS.

* * * * *